Oct. 9, 1956 P. O. ROBARDS 2,765,674
HAND BRAKE WHEEL
Filed Jan. 11, 1955 2 Sheets-Sheet 1
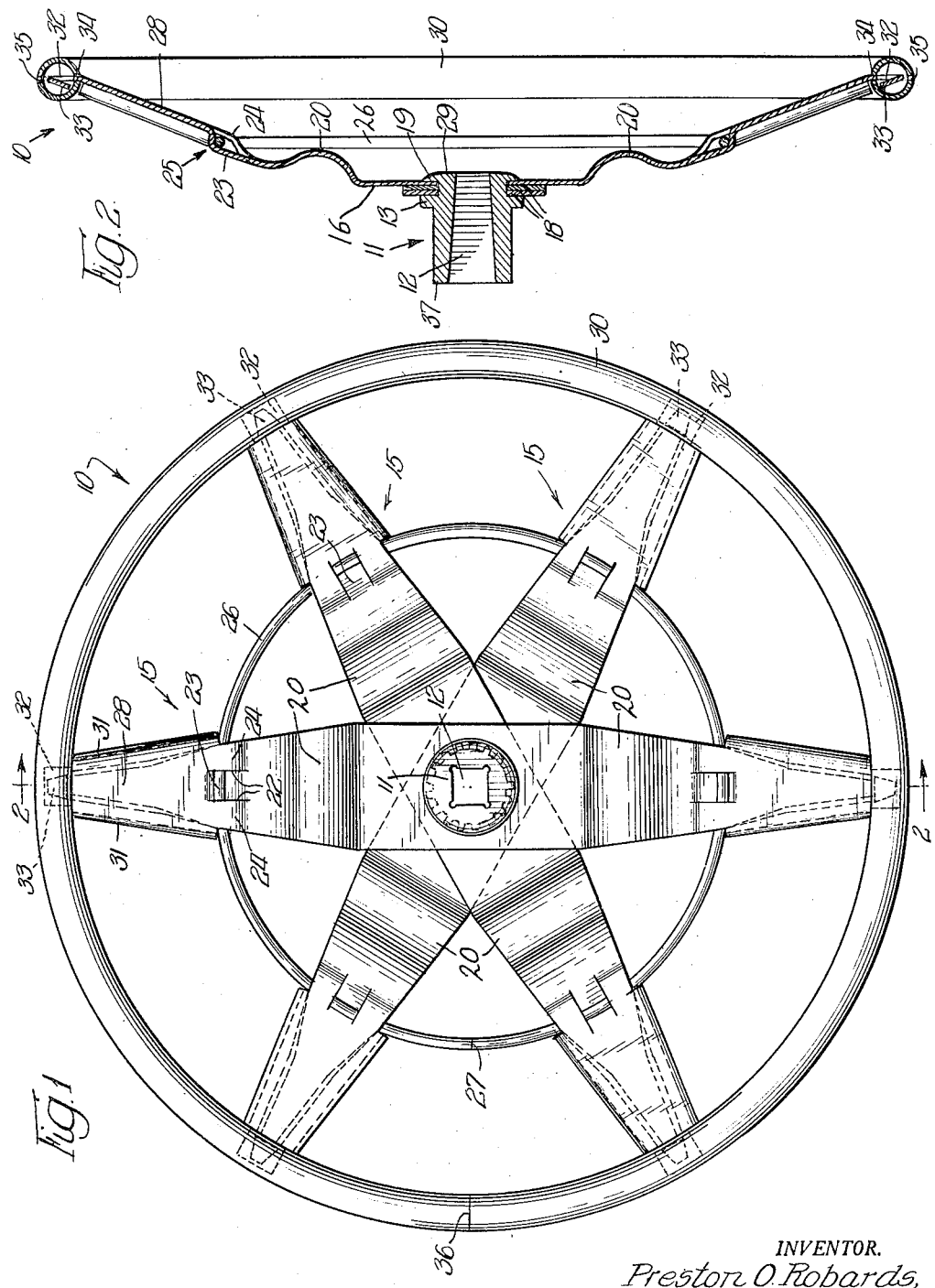
INVENTOR.
Preston O. Robards,
BY
Robert R. Lockwood
ATT'Y.

Oct. 9, 1956 P. O. ROBARDS 2,765,674
HAND BRAKE WHEEL
Filed Jan. 11, 1955 2 Sheets-Sheet 2
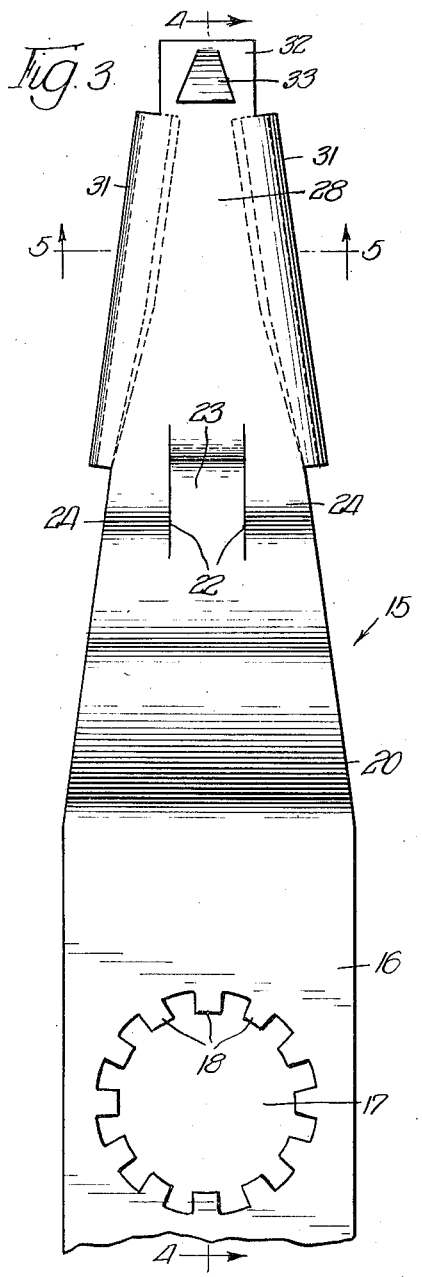
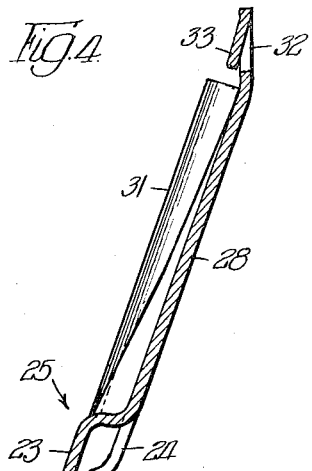
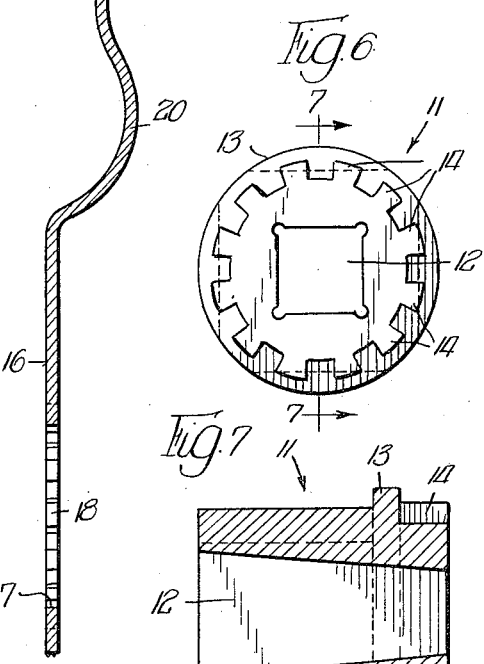
INVENTOR.
Preston O. Robards,
BY
Robert R. Lockwood
atty.

United States Patent Office 2,765,674
Patented Oct. 9, 1956

2,765,674

HAND BRAKE WHEEL

Preston O. Robards, Chicago, Ill.

Application January 11, 1955, Serial No. 481,212

9 Claims. (Cl. 74—552)

This invention relates, generally, to hand brakes for railway cars and it has particular relation to hand wheels for manual application of geared hand brakes.

Among the objects of this invention are: To provide a hand brake wheel that is light in weight, rugged, capable of withstanding limited deflection and which can be economically manufactured and installed; to employ duplex spoke members non-rotatably secured to a hub thereby providing two spokes for each member; to increase the flexibility of the spokes by transversely ribbing them adjacent the hub; to secure a guard ring to the spokes by inserting it in loops formed in the spokes outwardly of the ribbed portions; and to lock the spokes in a tubular rim by striking up lugs from their outer ends and inserting these ends in slots opening inwardly of the rim.

Other objects of this invention will, in part, be obvious and in part appear hereinafter.

This invention is disclosed in the embodiment thereof shown in the accompanying drawings and its comprises the features of construction, combination of elements and arrangements of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a view, in front elevation, of a hand brake wheel embodying the present invention;

Figure 2 is a vertical sectional view taken generally along the line 2—2 of Figure 1;

Figure 3 is a front view of the upper portion of one of the duplex spokes before it is assembled in the rim;

Figure 4 is a vertical sectional view taken generally along the line 4—4 of Figure 3;

Figure 5 is a horizontal sectional view taken generally along the line 5—5 of Figure 3;

Figure 6 is a view, in end elevation, of the hub of the wheel; and

Figure 7 is a vertical sectional view taken generally along the line 7—7 of Figure 6.

Referring now particularly to Figures 1 and 2 of the drawings it will be observed that the reference character 10 designates, generally, a hand brake wheel which is arranged to be mounted on the operating shaft of a geared hand brake mechanism mounted on one end of a freight car or the like for manually setting the brakes of the car when it has been cut out of a train and is standing on a siding. For this purpose a hub 11 is provided which is formed preferably of a malleable iron casting and it has a rectangular tapered opening 12 for non-rotatable mounting on the shaft of the geared hand brake mechanism as will be understood readily. Near one end the hub casting 11 is provided with a radially outwardly extending flange 13 and extending longitudinally therefrom, as shown in Figures 6 and 7, are radially outwardly extending splines 14 for non-rotatably receiving duplex spoke members, shown generally at 15, which are formed preferably of resilient sheets of metal by a suitable stamping operation.

Each of the duplex spoke members (three being employed in the embodiment illustrated) has a flat central portion 16, Figure 3, having a centrally located aperture 17 provided with inwardly directed splines 18 for interfitting with the splines 14 on the hub casting 11. As shown in Figure 1, the three duplex spoke members 15 are positioned on the hub casting 11 in equiangular relation so as to provide six spokes that are spaced 60° apart about the axis of rotation of the hub 11. In order to hold the spoke members 15 in position on the splines 14, the outer ends thereof are headed over as indicated at 19. If desired, weld metal may be deposited between the outer ends of the splines 14. The radially outwardly extending flange 13 limits the endwise location of the spoke members 15 as will be apparent from Figure 2.

With a view to increasing the flexibility of the spokes each of them adjacent the hub 11 is provided with a transversely ribbed section 20 which permits the outer ends of the spokes to flex without permanent distortion.

It is desirable to limit the possibility of a train man placing his arms between the outer ends of the spoke members 15. For this purpose longitudinal slits 22 are formed in the spokes outwardly of the transversely ribbed portions 20 and the section 23 therebetween is deformed inwardly leaving side sections 24 so that a loop, shown generally at 25, is provided. A guard ring 26 is threaded through the loops 25 and its ends are welded together as indicated at 27 in Figure 1.

As illustrated in Figures 2 and 4 the outer portions 28 of the spokes are inclined at an acute angle away from a plane containing the end 29 of the hub 11. The purpose of this is to space a tubular rim 30 which is attached to the outer ends of the spokes away from the brake mechanism on which the hub 11 is mounted and also away from the adjacent vertical car wall so as to facilitate operation of the brake mechanism by the train men. The rigidity of the outer portions 28 of the spokes is increased by turning over the edges 31 as illustrated more clearly in Figures 3, 4 and 5. These turned over edges 31 also provide comfortable finger bearing areas.

It will be observed in Figure 3 of the drawings that the outer end portion 32 of each of the spokes is generally rectangular in shape and that it has a lug 33 struck upwardly therefrom so that, as shown in Figures 2 and 4 of the drawings, it extends generally toward the hub 11. The outer end portions 32 of the spokes are inserted through correspondingly shaped slots 34, Figure 2, on the inside of the tubular rim 30. The spokes are deformed sufficiently so as to permit the end portions 32 which extend radially outwardly in a plane parallel to the plane containing the end 29 of the hub 11 to enter the slots 34. As soon as the lugs 33 are free to move within the tubular rim 30, because of their inherent resiliency and the manner in which they are formed and extend from the outer end portions 32, they spring to the positions shown and interlock with the tubular rim 30 and prevent withdrawal of the outer end portions 32 therefrom.

In order to prevent the collection of water within the tubular rim 30 drain holes 35, Figure 2, are provided. It will be noted that a drain hole 35 is provided opposite each of the slots 34.

For assembling the brake wheel 10 the duplex spoke members 15 are successively snapped into position by inserting the outer end portions 32 through the corresponding slots 34 in the tubular rim 30 where they are locked in position by the lugs 33. The guard ring 26 is threaded through the loops 25 and its ends are welded together at 27. The hub 11 then is inserted in the registering apertures 17 and the ends of the splines 14 are headed over as indicated at 19. The ends of the tubular rim 30 also are welded together as indicated at 36.

Additional rigidity is provided by riveting or welding together the overlapping flat central portions 16 after the previously described assembly is made.

The brake wheel 10 constructed as described is light in weight, rugged and is capable of withstanding substantial distortion without acquiring a permanent set. For illustrative purposes it is pointed out that the outside diameter of the tubular rim 30 is 22 inches. The overall distance between the end of the hub 11 and the opposite side of the tubular rim 30 is 5½ inches. Experience has indicated that the rim 30 can be deflected from the position shown in Figure 2 at one side a distance of 3 inches in one direction or the other parallel to the axis of rotation of the hub 11 without the spoke members 15 or the tubular steel rim 30 taking a permanent set. While the guard ring 26 effectively prevents the train man from placing his arm between the outer portions 28 of the spokes, it is spaced radially inwardly sufficiently far from the tubular rim 30 as to permit the train man to grip the latter with his gloved hands for rotating it to apply the brakes or to release them.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A hand brake wheel for manual application of geared hand brakes comprising, in combination, a hub casting adapted to be connected to an operating shaft of a geared hand brake mechanism, a plurality of duplex resilient sheet metal spoke members each having a flat central portion non-rotatably secured to said hub in uniform spaced relation whereby a plurality of uniformly spaced spokes are provided therearound, the outer end portion of each spoke having a lug struck up therefrom and extending generally toward said hub, and a tubular rim having radially inwardly opening slots for receiving said outer end portions of said spokes, said lugs preventing withdrawal of said outer end portions of said spokes from said rim.

2. A hand brake wheel for manual application of geared hand brakes comprising, in combination, a hub casting adapted to be connected to an operating shaft of a geared hand brake mechanism and having splines extending radially outwardly therefrom, three duplex resilient sheet metal spoke members each having a flat central apertured portion having inwardly directed splines for meshing with said splines on said hub casting in uniform spaced relation whereby six uniformly spaced spokes are provided therearound, means holding said spoke members against endwise movement along said splines, the outer end portion of each spoke having a lug struck up therefrom and extending generally toward said hub, and a tubular rim having six radially inwardly opening slots for receiving said outer end portions of said spokes, said lugs preventing withdrawal of said outer end portions of said spokes from said rim.

3. A hand brake wheel for manual application of geared hand brakes comprising in combination, a hub casting adapted to be connected to an operating shaft of a geared hand brake mechanism, a plurality of duplex resilient sheet metal spoke members each having a flat central portion non-rotatably secured to said hub in uniform spaced relation whereby a plurality of uniformly spaced spokes are provided therearound, the portions of said spokes adjacent said hub being ribbed to permit limited deflection of the outer ends in opposite directions parallel to the axis of rotation of said hub without permanent distortion, the outer end portion of each spoke extending radially outwardly and having a lug struck up therefrom and extending generally toward said hub, and a tubular rim having radially inwardly opening slots for receiving said outer end portions of said spokes, said lugs preventing withdrawal of said outer end portions of said spokes from said rim.

4. A hand brake wheel for manual application of geared hand brakes comprising, in combination, a hub casting adapted to be connected to an operating shaft of a geared hand brake mechanism, said hub casting having splines extending radially outwardly therefrom, three duplex resilient sheet metal spoke members each having a flat central apertured portion having inwardly directed splines for meshing with said splines on said hub casting in uniform spaced relation whereby six uniformly spaced spokes are provided therearound, said spokes extending at an acute angle away from the plane containing said one end of said hub casting and the portions adjacent thereto being ribbed to permit limited deflection of the outer ends in opposite directions parallel to the axis of rotation of said hub without permanent distortion, the outer end portion of each spoke extending radially outwardly and having a lug struck up therefrom and extending generally toward said hub, and a tubular rim having six radially inwardly opening slots for receiving said outer end portions of said spokes, said lugs preventing withdrawal of said outer end portions of said spokes from said rim.

5. A hand brake wheel for manual application of geared hand brakes comprising, in combination, a hub casting adapted to be connected to an operating shaft of a geared hand brake mechanism, a plurality of duplex resilient sheet metal spoke members each having a flat central portion non-rotatably secured to said hub in uniform spaced relation whereby a plurality of uniformly spaced spokes are provided therearound, said spokes extending at an acute angle away from the plane containing said one end of said hub casting and the portions adjacent thereto being ribbed to permit limited deflection of the outer ends in opposite directions parallel to the axis of rotation of said hub without permanent distortion, the central portion of each spoke outwardly of its ribbed portion having a pair of lengthwise extending slits with the section between the slits deformed oppositely to the side sections to provide a loop in each spoke, a guard ring extending through said loops, the outer end portion of each spoke extending radially outwardly and having a lug struck up therefrom and extending generally toward said hub, and a tubular rim having radially inwardly opening slots for receiving said outer end portions of said spokes, said lugs preventing withdrawal of said outer end portions of said spokes from said rim.

6. A hand brake wheel for manual application of geared hand brakes comprising, in combination, a hub casting having a central rectangular tapered opening for telescoping with an operating shaft of a geared hand brake mechanism, said hub casting having a radially outwardly extending flange near one end and splines extending from said flange toward said one end, three duplex resilient sheet metal spoke members each having a flat central apertured portion having inwardly directed splines for meshing with said splines on said hub casting in uniform spaced relation whereby six uniformly spaced spokes are provided therearound, the outer end of said splines being headed over to retain said spoke members in position thereon, said spokes extending at an acute angle away from the plane containing said one end of said hub casting and the portions adjacent thereto being ribbed to permit limited deflection of the outer ends in opposite directions parallel to the axis of rotation of said hub without permanent distortion, the central portion of each spoke outwardly of its ribbed portion having a pair of lengthwise extending slits with the section between the slits deformed oppositely to the side sections to provide a loop in each spoke, a guard ring extending through said loops, the outer end portion of each spoke extending radially outwardly and having a lug struck up therefrom and extending generally toward said hub, and a tubular rim having six radially inwardly opening slots for receiving said outer end portions of said spokes, said lugs preventing withdrawal of said outer end portions of said spokes from said rim.

7. A hand brake wheel for manual application of geared hand brakes comprising, in combination, a hub casting adapted to be connected to an operating shaft of a geared hand brake mechanism, a plurality of duplex resilient sheet metal spoke members each having a flat central portion non-rotatably secured to said hub in uniform spaced relation whereby a plurality of uniformly spaced spokes are provided therearound, said spokes extending at an acute angle away from the plane containing said one end of said hub casting and the portions adjacent thereto being ribbed to permit limited deflection of the outer ends in opposite directions parallel to the axis of rotation of said hub without permanent distortion, the central portion of each spoke outwardly of its ribbed portion having a pair of lengthwise extending slits with the section between the slits deformed oppositely to the side sections to provide a loop in each spoke, a guard ring extending through said loops, the opposite edges of each spoke beyond said guard ring being turned over to increase the rigidity thereof, the outer end portion of each spoke extending radially outwardly and having a lug struck up therefrom and extending generally toward said hub, and a tubular rim having radially inwardly opening slots for receiving said outer end portions of said spokes, said lugs preventing withdrawal of said outer end portions of said spokes from said rim.

8. A hand brake wheel for manual application of geared hand brakes comprising, in combination, a hub casting having a central rectangular tapered opening for telescoping with an operating shaft of a geared hand brake mechanism, said hub casting having a radially outwardly extending flange near one end and splines extending from said flange toward said one end, three duplex resilient sheet metal spoke members each having a flat central apertured portion having inwardly directed splines for meshing with said splines on said hub casting in uniform spaced relation whereby six uniformly spaced spokes are provided therearound, the outer end of said splines being headed over to retain said spoke members in position thereon, said spokes extending at an acute angle away from the plane containing said one end of said hub casting and the portions adjacent thereto being transversely ribbed to permit limited deflection of the outer ends in opposite directions parallel to the axis of rotation of said hub without permanent distortion, the central portion of each spoke outwardly of its ribbed portion having a pair of lengthwise extending slits with the section between the slits deformed oppositely to the side sections to provide a loop in each spoke, a guard ring extending through said loops, the opposite edges of each spoke beyond said guard ring being turned over to increase the rigidity thereof, the outer end portion of each spoke extending radially outwardly and having a lug struck up therefrom and extending generally toward said hub, and a tubular rim having six radially inwardly opening slots for receiving said outer end portions of said spokes, said lugs preventing withdrawal of said outer end portions of said spokes from said rim, said rim having radially outwardly opening holes opposite said slots to permit escape of water in said rim.

9. A hand brake wheel for manual application of geared hand brakes comprising, in combination, a hub casting adapted to be connected to an operating shaft of a geared hand brake mechanism, a plurality of duplex resilient sheet metal spoke members each having a flat central portion non-rotatably secured to said hub in uniform spaced relation whereby a plurality of uniformly spaced spokes are provided therearound, the portions of said spokes adjacent said hub being flexible to permit limited deflection of the outer ends in opposite directions parallel to the axis of rotation of said hub without permanent distortion, the outer end portion of each spoke extending radially outwardly and having a lug struck up therefrom and extending generally toward said hub, and a tubular rim having radially inwardly opening slots for receiving said outer end portions of said spokes, said lugs preventing withdrawal of said outer end portions of said spokes from said rim.

References Cited in the file of this patent

UNITED STATES PATENTS

| | | |
|---|---|---|
| 488,539 | Claus | Dec. 27, 1892 |
| 1,031,515 | Bluemel | July 2, 1912 |
| 1,433,522 | Angsten | Oct. 31, 1922 |
| 1,818,992 | Klopping | Aug. 18, 1931 |